Jan. 26, 1926.  1,570,879
F. J. DOUR
SECTIONAL PNEUMATIC TIRE RIM
Filed July 19, 1924
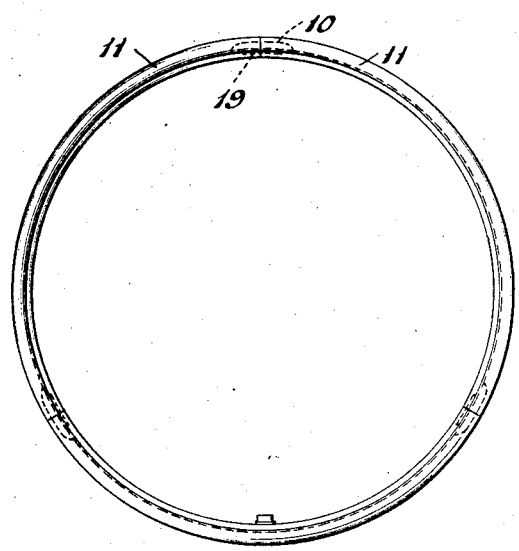
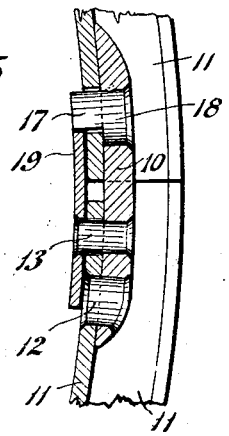
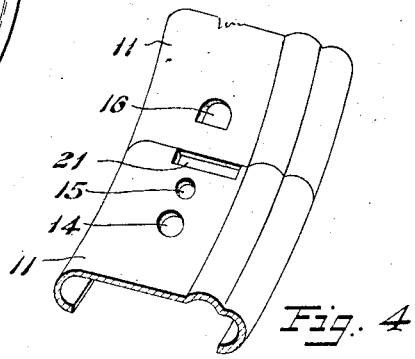
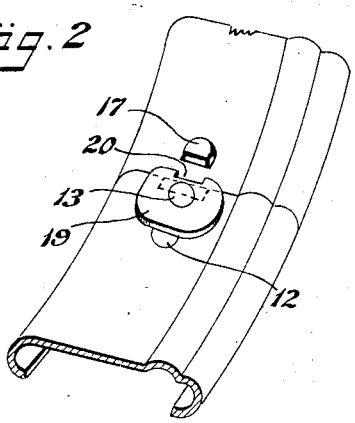
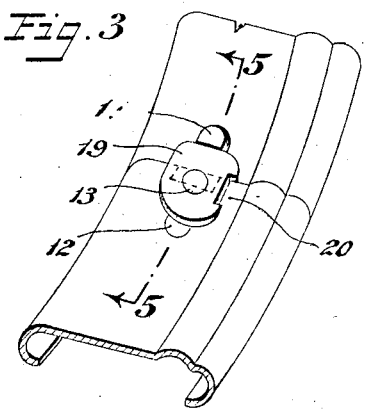
INVENTOR
Frederick J. Dour.
BY
ATTORNEY Patented Jan. 26, 1926.

1,570,879

UNITED STATES PATENT OFFICE.

FREDERICK J. DOUR, OF BROOKLYN, NEW YORK, ASSIGNOR TO PRINDOR SECTIONAL RIM CO., OF NEW YORK, N. Y.

SECTIONAL PNEUMATIC-TIRE RIM.

Application filed July 19, 1924. Serial No. 726,933.

*To all whom it may concern:*

Be it known that I, FREDERICK J. DOUR, of the city of New York, Brooklyn, in the county of Kings and State of New York, have invented certain new and useful Improvements in Sectional Pneumatic-Tire Rims, of which the following is a specification.

Among the principal objects which the present invention has in view are: to unite in service the elements of a sectional pneumatic tire rim; to prevent the disengagement of the rim consequent upon the relaxing or deflation of the tire; to avoid frictional contact between the parts of the rim and the creaking concomitant thereon; to simplify and cheapen the construction.

Drawings.

Figure 1 is a side edge view of a sectional pneumatic tire rim locked in service relation in accordance with the present invention.

Figure 2 is a perspective view of connected fragments of the tire rim sections shown on enlarged scale, the parts being connected but not locked.

Figure 3 is a similar view showing the parts in their locked relation.

Figure 4 is a similar view showing the fragments with the connecting and locked attachments removed therefrom.

Figure 5 is a longitudinal section on enlarged scale of the fragments shown in Figure 3, the section being taken as on the line 5—5 in said Figure 3.

Description.

As shown best in Figure 5, the aligning plate 10 is mounted permanently and rigidly on one of the sections 11 and in the center of the channel thereof. The method employed for securing the plate 10 is preferably the rivet stud 12 and the pivot 13. One plate 10 is secured at one end of each of the sections 11. Each section has perforations 14 and 15 which receive the studs 12 and pivots 13, respectively. The opposite end of each section 11 has a recess 16 designed to receive the flattened extremity 17 of the stud 18.

The stud 18 as shown best in Figure 5 of the drawings is disposed adjacent the end of the plate 10 furthest removed from the stud 12. The stud 18 is permanently mounted in the plate 10, the extremity 17 being designed to extend through the passage 16 to a level flush with the swinging lock 19.

The lock 19 rotates on the pivot 13 from the position shown in Figure 2 of the drawings, to the position shown in Figure 3 of the drawings, when it is desired to lock the sections rigidly in service relation. It will be noted in passing that when the lock 19 is in the position shown in Figure 3 of the drawings, the extremity 17 of the stud 18 is forced rigidly against the back of the passage 16. In this manner all creaking or wear of the part is avoided.

As seen best in Figures 2 and 3 of the drawings, the locks 19 are each provided with a recess 20. The recess 20 registers with a recess 21 formed in the end of the section 11 carrying the lock 19. The registration referred to occurs only when the lock 19 is in the position shown in Figure 2 of the drawings. A passage is thereby afforded for a screw-driver or tire tool which is used to pry the sections apart, an action necessitated by the close fit of the reinforced lips of the tire shoe. In the position shown in Figure 3 of the drawings, the recess 21 is covered so that the admission thereto of grit or other obnoxious material is avoided.

It is obvious that when the rim sections 11 are thus locked into position, the deflation of the tire will not result in separation or loosening of the sections 11.

Claim.

A sectional pneumatic tire rim comprising an aligning plate rigidly connected with one of said sections which overhangs an end thereof; a stud rigidly mounted in said aligning plate for extension through a recess in the adjacent section; and a swinging lock pivotally mounted on the first mentioned section to swing into engagement in the path of said stud and across the junction between the sections to prevent the contraction of the rim formed by said sections.

FREDERICK J. DOUR.